(12) United States Patent
Zahn et al.

(10) Patent No.: US 7,094,365 B2
(45) Date of Patent: Aug. 22, 2006

(54) PENTAFLUOROSULFANYL-SUBSTITUTED THIENOTHIOPHENE MONOMERS AND CONDUCTING POLYMERS

(75) Inventors: Steffen Zahn, Pennsburg, PA (US); Andrew Francis Nordquist, Whitehall, PA (US); Kristen Elaine Minnich, Allentown, PA (US); Gauri Sankar Lal, Whitehall, PA (US); William Franklin Burgoyne, Jr., Bethlehem, PA (US); Axel Klauck-Jacobs, Whitehall, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/958,054

(22) Filed: Oct. 4, 2004

(65) Prior Publication Data

US 2006/0071199 A1   Apr. 6, 2006

(51) Int. Cl.
H01B 1/12       (2006.01)
C07D 333/00     (2006.01)

(52) U.S. Cl. ............... 252/500; 528/377; 549/51; 549/52

(58) Field of Classification Search ............... 252/500; 528/377, 378; 549/51, 52
See application file for complete search history.

(56) References Cited

U.S. PATENT DOCUMENTS

| | | | |
|---|---|---|---|
| 4,639,328 A | 1/1987 | Krause et al. | |
| 4,659,503 A | 4/1987 | Eidenschink et al. | |
| 5,055,223 A | 10/1991 | Reiffenrath et al. | |
| 5,300,575 A | 4/1994 | Jonas et al. | |
| 5,892,244 A | 4/1999 | Tanaka et al. | |
| 5,998,804 A | 12/1999 | Sug et al. | |
| 6,585,914 B1 | 7/2003 | Marks et al. | |
| 6,645,401 B1 | 11/2003 | Giles et al. | |
| 6,676,857 B1 | 1/2004 | Heeney et al. | |
| 6,695,978 B1 | 2/2004 | Worrall et al. | |
| 6,709,808 B1 | 3/2004 | Lelental et al. | |
| 6,818,260 B1 * | 11/2004 | Farrand et al. | 428/1.1 |
| 2003/0085381 A1 | 5/2003 | Warrall et al | |
| 2003/0216476 A1 | 11/2003 | Kleemann | |
| 2004/0010115 A1 | 1/2004 | Sotzing | |
| 2004/0051084 A1 | 3/2004 | Wessling et al | |

FOREIGN PATENT DOCUMENTS

WO   WO 00/79617   12/2000

OTHER PUBLICATIONS

Neef, et al., "Synthesis and Electronic Properties of Poly (2-phenylthieno [3,4-b]thiophene): A New Low Band Gap Polymer", Chem. Matter, 1999, 11,1 p. 1957-1958.
Pomerantz et al "Poly(2-decylthieno[3,4b]thiophene). A New Soluble Low-Bandgap Conducting Polymer", Sythetic Metals 84 (1997), p. 243-244.
U.S. Appl. No. 10/958,068, filed Oct. 4, 2004, Nordquist et al.
Winter et al. "New acrylate systems; derivatives of B-SF5-acrylic acid"; Journal of Fluorine Chemistry; 125 (2004) p. 37-41.
Leclerc et al, Structural analysis of Poly(3-alkylthiophene)s; Makromol Chem. 190, (1989); p. 3105-3116.
U.S. Appl. No. 11/229,516, filed Sep. 20, 2005, Zahn et al.
European Search Report dated Dec. 30, 2005.

* cited by examiner

Primary Examiner—Mark Kopec
(74) Attorney, Agent, or Firm—Michael K. Boyer

(57) ABSTRACT

Thienothiophene monomers having an $SF_5$ group and conducting oligomers and polymers formed by the polymerization of such monomers and their use as hole injection materials, charge transport materials, or as semiconductors. The compound may be of the formula:

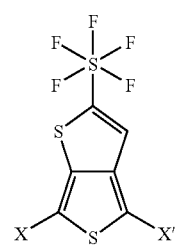

A where X and X' are independently H, halogen atoms (e.g., F, Cl, Br, and I), MgCl, MgBr, MgI, $Sn(R')_3$, where R' is $C_{1-6}$ alkyl or $-OC_{1-6}$ alkyl, boronic acid, boronic ester, $-CH=CHR''$ (where R'' is H or $C_{1-6}$ alkyl), $-OC_{1-6}$ alkyl, $-COOC_{1-6}$ alkyl, $-S-COR'''$ and $-COR'''$ (where R''' is H or $C_{1-6}$ alkyl), $-C\equiv CH$, or polymerizable aromatic rings (such as phenyl, naphthalene, pyrrole, dithiophene, thienothiophene, thiophene and so forth.

18 Claims, No Drawings ns 84 (1997) 243–244 discloses various polymeric thienothiophenes including poly(2-decyl thieno[3,4-b] thiophene) and a process for preparing the polymer.

PENTAFLUOROSULFANYL-SUBSTITUTED THIENOTHIOPHENE MONOMERS AND CONDUCTING POLYMERS

BACKGROUND OF THE INVENTION

Electrically conducting polymers have developed into a material of choice for a variety of organic optoelectronics applications. Such applications for optoelectronics include polymeric light emitting diodes (thin film displays), solid state lighting, organic photovoltaics, advanced memory devices, organic field effect transistors, ultracapacitors and electroluminescent devices.

One of the first of many electrically conducting polymers was polyacetylene and the discovery of conductivity in such polymer created substantial interest in other types of electrically conducting polymers. Recently, conjugated poly (thiophenes) and substituted thiophene derivatives have been discovered to have electrically conducting properties. A feature of these polymers is that they can be cast into films and doped with conventional p- and n-type dopants or the doped polymers can be cast into films and their electrical properties modified accordingly, thereby lending themselves suitable for use in a variety of optoelectronic applications.

Representative articles and patents illustrating thiophene monomers and electrically conducting polymers including thiophene and derivatives thereof are as follows:

U.S. Pat. No. 6,645,401 discloses conjugated polymers of dithienothiophene (DTT) with vinylene or acetylene connecting groups as suitable for producing semiconductors or charge transport materials useful in electrooptical and electronic devices including field effect transistors, photovoltaic, and sensor devices. Polymers containing DTT formed by electrochemical polymerization were known but had limitations in terms of solubility and photovoltaic properties.

U.S. Pat. No. 6,585,914 discloses fluorocarbon-functionalized and/or heterocyclic modified poly(thiophenes) such as α,ω-diperfluorohexylsexithiophene for use in forming films which behave as n-type semiconductor. These poly (thiophenes) also can be used to form thin film transistors with FET (Field effect transistor) mobility.

U.S. Pat. No. 6,676,857 discloses polymers having polymerized units of 3-substituted-4-fluorothiophene as liquid crystal materials for use in semiconductors, charge transport materials, electrooptical field effect transistors photovoltaic and sensor devices.

U.S. Pat. No. 6,695,978 discloses polymers of benzo[b] thiophene and bisbenzo[b]thiophene and their use as semiconductors and as charge transport materials in electrooptical devices.

U.S. Pat. No. 6,709,808 discloses image forming materials incorporating electrically conductive polymers based upon pyrrole-containing thiophene polymers and aniline containing polymers.

US2004/00010115A1 discloses homopolymers and copolymers comprised of repeating units of thieno[3,4-b] thiophene for use in electroactive applications. Copolymers can be formed with 3,4-ethylendioxythiophene, dithiophene, pyrrole, benzothiophene monomers, and the like.

The article, Synthesis and Electronic Properties of Poly (2-phenyl-thieno[3,4-b]thiophene): A new Low Band Gap Polymer, Chem. Mater. 1999, 11, 1957–1958 discloses various thienothiophene polymers including poly(2-phenyl thieno[3,4-b]thiophene) and poly(2-decyl thieno[3,4-b]-thiophene) as conducting polymers.

The article, Poly(2-decyl thieno[3,4-b]thiophene): a New Soluble Low-Band gap Conducting Polymer, Synthetic Met-

BRIEF SUMMARY OF THE INVENTION

The invention relates to thienothiophene monomers having an $SF_5$ group and to conducting oligomers and polymers formed by the polymerization of such monomers (polymerized units) and their use as hole injection materials, charge transport materials, or as semiconductors, in optical, electrooptical or electronic devices, polymeric light emitting diodes (PLED), organic field effect transistors (FET or OFET), flat panel display applications (i.e. LCD's), radio frequency identification (RFID) tags, ultracapacitors, organic photovoltaics (OPV's), sensors, in small molecule or polymer based memory devices, electrolytic capacitors and as a hydrogen storage material.

Advantages can be achieved using the monomers and polymers based upon $SF_5$ substituted thienothiophenes and derivatives thereof. The advantages provided by some of the monomers and polymers of this invention may include one or more of the following: conducting polymers having low negative workfunction values making them suited as hole injecting materials; conducting polymers having low band gap values making them suitable transparent conductors; conducting polymers useful in a wide range of electronic applications; and hole injection material having a matched workfunction levels between the hole injection material and the light emitting layer.

DETAILED DESCRIPTION OF THE INVENTION

This invention relates to compositions of matter based upon the monomer, 2-pentafluorosulfanyl-thieno[3,4-b] thiophene, its derivatives, and to conjugated oligomers and polymers comprised of multiple units of the respective monomers.

One aspect of the invention relates to compositions of matter represented by formula A:

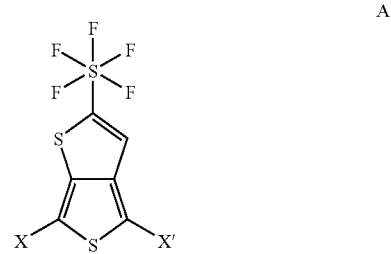

where X and X' are independently selected from the group consisting of H, halogen atoms, MgCl, MgBr, MgI, $Sn(R')_3$, where R' is $C_{1-6}$ alkyl or $-OC_{1-6}$ alkyl, boronic acids, boronic esters, $-CH=CHR''$ where R'' is H or $C_{1-6}$ alkyl, $-OC_{1-6}$ alkyl, $-COOC_{1-6}$ alkyl, $-S-COR'''$, $-COR'''$ where R''' is H or $C_{1-6}$ alkyl, $-C\equiv CH$, and polymerizable aromatic groups, such as phenyl, naphthalene, pyrrole, dithiophene, thienothiophene, thiophene and so forth. Examples of halogen atoms include F, Cl, Br, and I.

The preferred monomer for producing homopolymers and copolymers is one where X and X' are H and represented by the formula B:

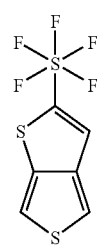

B

Electrically conducting oligomers and polymers comprised of polymerized units of substituted 2-pentafluorosulfanyl-thieno[3,4-b]thiophene are another aspect of the invention and are represented by formula C:

C where n is an integer, Y is —$CZ^1$=$CZ^2$— or —C≡C—, and $Z^1$ and $Z^2$ are independently H, F, Cl or CN. Oligomers often have from about 2 to 10 units may be used for example to produce memory and field effect transistor devices. Polymers having from 11 to 50,000 units, often from 20 to 10,000 units may be quite useful in preparing films as hole injection materials in various electrooptical applications.

Preferred homopolymers are represented by the formula D:

D where n is an integer as represented above.

The monomer of formula A where X and X' are H can be synthesized by the representative 5 step reaction scheme as follows:

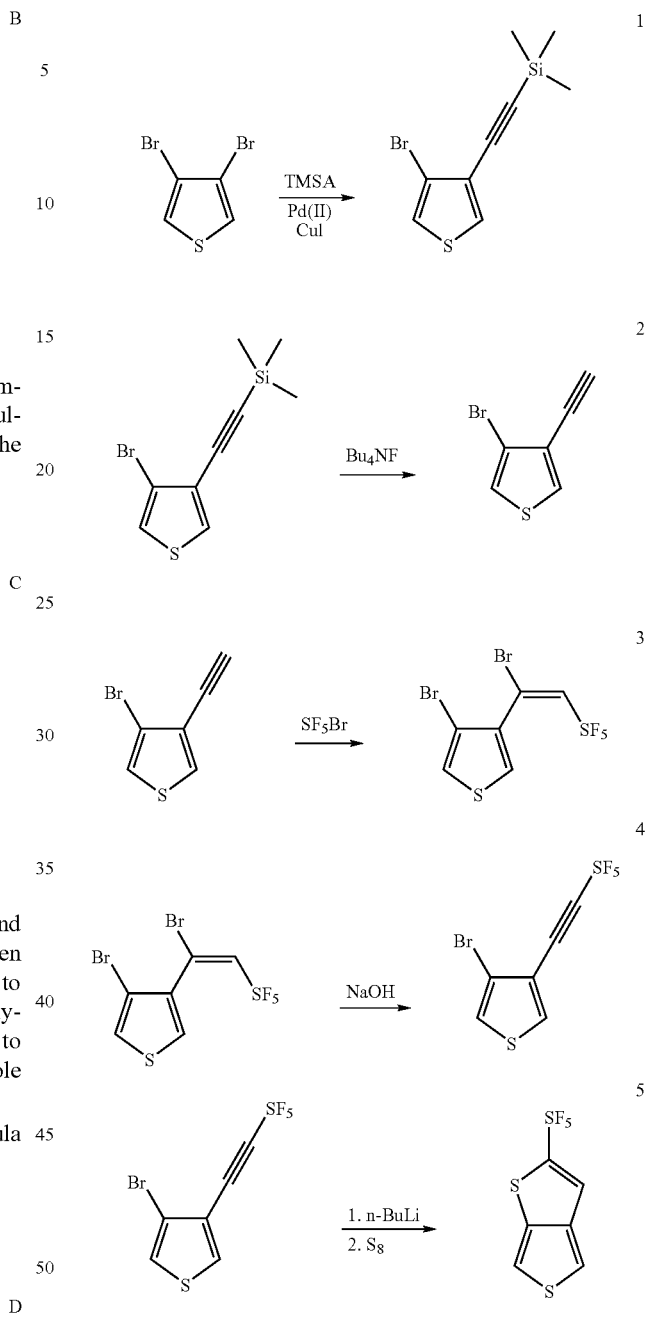

Many of the derivatives of the respective monomers where X and X' are other than H are formed post formation of the monomers. In post reaction one or both hydrogen atoms may be replaced with other functional groups. Alternatively, some of the derivatives may be formed, ab initio, by converting thiophene to the derivative and then undergoing the 5 step reaction procedure where the X and X' are compatible with the chemistries outlined in steps 1–5.

Polymerization of 2-pentafluorosulfanyl-thieno[3,4-b] thiophene monomers can be effected utilizing an aqueous phase polymerization method wherein the monomer 2-pentafluorosulfanyl-thieno[3,4-b]thiophene, a polyanion and an oxidant are reacted in the presence of water under reaction conditions sufficient to form the homopolymer, e.g., poly(2-pentafluorosulfanyl-thieno[3,4-b]thiophene). By this polymerization process, the resulting polymer may be polymerized and doped in a single step.

The amount of polyanion and oxidant to be employed in the aqueous polymerization method may broadly vary and can be determined for any given polymerization without undue experimentation. For example the weight ratio of thieno[3,4-b]thiophene monomer to a desired polyanion typically ranges from 0.001 to 50, preferably 0.05 to 2.0. The mole ratio of thieno[3,4-b]thiophene monomer to a desired oxidant typically ranges from 0.01 to 10 preferably 0.1 to 2.5. In the case of ferric sulfate, the amount used ranges from 0.1 to 5 of thieno[3,4-b]thiophene. The nature of the oxidant may be varied in order to address variants in the ionization potential of the utilized monomers. Various Fe(II)/Fe(III) couplets are known that display different potential depending on their respective ligands (i.e. $FeCl_3$; $Fe_2(S_2O_8)_3$; $Fe(phen)_3$). If weaker oxidants are required Cu based couplets may be considered. If stronger oxidants are needed Co based couplets should be considered.

Strong oxidants are employed in the polymerization process. Persulfates and iron (III) salts of organic acids and inorganic acids containing organic residues are preferred because they are not corrosive. Examples of iron (III) salts of organic acids are the Fe(III) salts of $C_{1-30}$ alkyl sulfonic acids, such as methane or dodecane sulfonic acid; aliphatic $C_{1-20}$ carboxylic acids, such as 2-ethylhexylcarboxylic acid, aliphatic perfluorocarboxylic acids, such as trifluoroacetic acid and perfluorooctanoic acid; aliphatic dicarboxylic acids, such as oxalic acid and, aromatic, optionally $C_{1-20}$-alkyl-substituted sulfonic acids, such as benzenesulfonic acid, p-toluene-sulfonic acid and dodecyl benzenesulfonic acid. Specific examples of iron salts include $FeCl_3$, $Fe_2(SO_4)_3$, $Fe(ClO_4)_3$ and $Fe_2(S_2O_8)_3$. Other oxidants include $H_2O_2$, $K_2Cr_2O_7$, ammonium persulfate, potassium permanganate, copper tetrafluoroborate, iodine, air and oxygen.

Suitable polyanions include an anion of a polycarboxylic acid, such as polyacrylic acid, polymethacrylic acid, Nafion®, polymaleic acid, and polymeric sulfonic acids, such as polystyrene sulfonic acid and polyvinyl sulfonic acid. The polycarboxylic and polysulfonic acids may also be copolymers of vinyl carboxylic and vinyl sulfonic acids with other monomers, such as acrylates and styrene. The molecular weight of the acids supplying the polyanions is preferably in the range from 1,000 to 500,000, preferably from 2000 to 500,000 and most preferably about 200,000.

Monomers of the formula A lend themselves to metal-catalyzed polymerizations as described in the open literature. Conditions can vary depending on the nature of the X and X' substituents.

A method for preparing oligomers and polymers, most preferably, poly(2-pentafluorosulfanyl-thieno[3,4-b]thiophene), involves an electrochemical process wherein 2-pentafluorosulfanyl-thieno[3,4-b]thiophene is polymerized in an electrochemical cell using a three electrode configuration. A suitable three electrode configuration comprises a button working electrode selected from the group consisting of platinum, gold and vitreous carbon button working electrodes, a platinum flag counter electrode and an Ag/Ag+ non-aqueous reference electrode. Suitable electrolytes are selected from the group consisting of tetrabutylammonium perchlorate/acetonitrile, lithium triflate/acetonitrile and tetrabutylammonium hexafluorophosphate/acetonitrile.

Films of the thienothiophene oligomers and polymers may be doped with conventional p- and n-type dopants post polymerization of the respective monomers. The doping process typically involves treatment of the film semiconductor material with an oxidizing or reducing agent in a redox reaction to form delocalized ionic centers in the material, with the corresponding counterions derived from the applied dopants. Doping methods comprise for example exposure to a doping vapor in the atmospheric or at a reduced pressure, electrochemical doping in a solution containing a dopant, bringing the dopant in contact with the semiconductor material to be thermally diffused, and ion-implantantion of the dopant into the semiconductor material.

Conductive polymeric films having holes (p-doped) can be formed via conventional p-dopants which include halogen atoms, e.g., $I_2$, $Cl_2$, $Br_2$, ICl, $ICl_3$, IBr and IF, Lewis acids, e.g., $PF_5$, $AsF_5$, $SbF_5$, $BF_3$, $BCl_3$, $SbCl_5$, $BBr_3$ and $SO_3$, protonic acids, organic acids, or amino acids, e.g., HF, HCl, $HNO_3$, $H_2SO_4$, $HClO_4$, $FSO_3H$ and $ClSO_3H$, transition metal compounds, e.g., $FeCl_3$, $Fe(OCl)_3$, $Fe(ClO_4)_3$, $Fe(4-CH_3C_6H_4SO_3)_3$, $TiCl_4$, $ZrCl_4$, $HfCl_4$, $NbF_5$, $NbCl_5$, $TaCl_5$, $MoF_5$, $MoCl_5$, $WF_5$, $WCl_6$, $UF_6$ and $LnX_3$ wherein Ln is a lanthanoid and X is an anion, e.g., $Cl^-$, $Br^-$, $I^-$, $I_3^-$, $HSO_4^-$, $SO_4^{2-}$, $NO_3^-$, $ClO_4^-$, $BF_4^-$, $B_{12}F_{12}^{2-}$, $PF_6^-$, $AsF_6^-$, $SbF_6^-$, $FeCl_4^-$, $Fe(CN)_6^{3-}$, and anions of various sulfonic acids, such as aryl-$SO_3^-$. Also, $O_2$, as well as $O_3$ may be used.

Conductive polymeric films employing electrons as carriers as in n-doped polymeric films utilize conventional n-dopants which include the alkali metals (e.g., Li, Na, K, Rb, and Cs), alkaline-earth metals (e.g., Ca, Sr, and Ba).

The 2-pentafluorosulfanyl-thieno[3,4-b]thiophene monomer and its derivatives can be copolymerized with other polymerizable monomers capable of forming electrically conductive polymers. Such monomers include benzo- and bisbenzothiophenes, thienothiophenes, thiophenes, dithienothiophenes, pyridylthiophenes, substituted thiophenes, substituted thieno[3,4-b]thiophenes, dithieno[3,4-b:3',4'-d]thiophene, pyrroles, bithiophenes, substituted pyrroles, phenylene, substituted phenylenes, naphthalene, substituted naphthalenes, biphenyl and terphenyl and their substituted versions, phenylene vinylene and substituted phenylene vinylene. Other monomers are described in U.S. Pat. No. 4,959,430, and U.S. Pat. No. 4,910,645 and such monomers are incorporated by reference.

In processing oligomers and polymers of 2-pentafluorosulfanyl-thieno[3,4-b]thiophene and derivatives, additives such as ethylene glycol, diethylene glycol, mannitol, propylene 1,3-glycol, butane 1,4-glycol, N-methylpyrrolidone, sorbitol, glycerol, propylene carbonate and other appropriate high boiling organics can be added to dispersions to improve conductivity of the films prepared from these dispersions. Other common additives for tailoring electrically conductive polymers can be employed as desired and these include antioxidants, UV stabilizers, surfactants, and conductive fillers such as particulate copper, silver, nickel, aluminum, carbon black and the like. Non-conductive fillers such as talc, mica, wollastonite, silica, clay, $TiO_2$, dyes, pigments and the like can also be incorporated to promote specific properties such as increased modulus, surface hardness, surface color and the like.

The following examples are provided to illustrate various embodiments and comparisons and are not intended to restrict the scope of the invention.

EXAMPLE 1

Production of 2-pentafluorosulfanyl-thieno[3,4-b]thiophene (2-SF$_5$-TT)

The purpose of this example is to provide a representative five step route to produce the monomer 2-pentafluorosulfanyl-thieno[3,4-b]thiophene (2-SF$_5$-TT) having the formula:

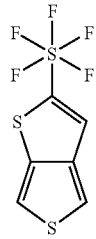

Step 1 Formation of 3-bromo-4-(trimethylsilylethynyl)thiophene

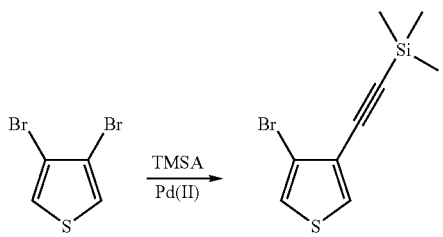

A 2-liter round-bottomed, three-necked flask was equipped with a reflux condenser, a mechanical stirrer, and a thermocouple, then purged with dry nitrogen gas. The flask was then charged with 240 g diethylamine (previously dried over KOH pellets and filtered), 387.04 g (1.60 mol.) 3,4-dibromothiophene, 800 mg (3.04 mmol) triphenylphosphine, 600 mg (5.48 mmol) copper(I)iodide, and 78.56 g (0.80 mol.) trimethylsilylacetylene. The stirred mixture was warmed to 40° C. 2.00 g (2.8 mmol.) of dichlorobis(triphenylphosphine)palladium(II) was then added. The reaction was maintained at 40° C. for 4 hrs with mechanical stirring and a static nitrogen blanket. At that point the reaction mixture was deemed complete and the reaction mixture was cooled to room temperature.

Recovery of the product, 3-bromo-4-(trimethylsilylethynyl)thiophene, was effected by placing the reaction mixture on a roto-evaporator and the diethylamine was removed by evaporation. 600 mL of pentane was added to the residual from evaporation along with 40 g of activated carbon (Darco, 12-20 mesh). The pentane solution was then filtered through a silica gel column (100 g) to remove palladium, followed by 600 mL or more of pentane. The pentane solvent from the collected solution was removed via evaporation on a roto-evaporator. Mass of isolated crude product was approximately 316 g. The residual material was vacuum distilled and 3-bromo-4-(trimethylsilylethynyl)thiophene recovered. $^1$H-NMR: δ (ppm) 0.3 (s), 7.19, 7.45; $^{13}$C-NMR: δ (ppm) −0.1, 97, 113, 122, 123, 129.

Step 2 Formation of 3-bromo-4-ethynylthiophene

The product of step one was converted to 3-bromo-4-ethynylthiophene according to the equation as follows:

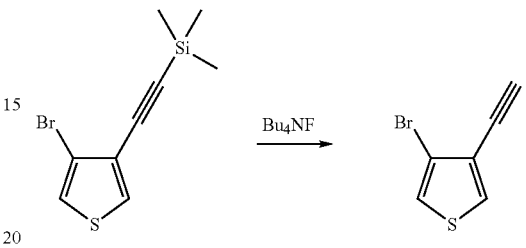

3-Bromo-4-(trimethylsilylethynyl)thiophene (10 g, 38 mmol) and THF (45 mL) was stirred and cooled to −5° C. Tetrabutylammonium fluoride (40 mL 1 M in THF) was added slowly maintaining the temperature −5° to 0° C. The reaction was stirred for 30 minutes after the addition of the tetrabutylammonium fluoride was complete. Water (100 mL) was added to the flask and the product extracted with pentane. The pentane layer was washed with dilute HCl then water and finally dried over magnesium sulfate. The product was recovered as an orange liquid after the solvent was removed by rotary evaporation. The yield of 3-bromo-4-ethynylthiophene was 92%. Bp 58° C., 1.5 mm Hg. $^1$H-NMR: δ (ppm) 7.4, 7.5, 7.7; $^{13}$C-NMR: δ (ppm) 77, 82, 114, 124, 125, 134.

Step 3 Formation of 3-Bromo-4-(1-bromo-2-pentafluorosulfanyl-vinyl)-thiophene

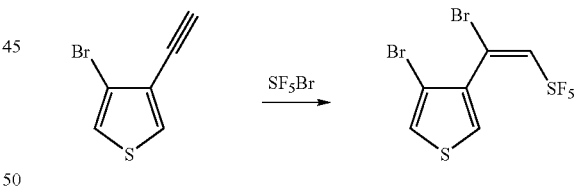

3-Bromo-4-ethynylthiophene (7.3 g, 39 mmol), pentane (130 mL) and potassium fluoride (0.38 g) were charged to a stainless steel Parr reactor. The solution was cooled to −50° C. and degassed. Pentafluorosulfur bromide (42 mmol) was condensed into the solution at −50° C. and stirred for one hour (alternatively pentaflurorsulfur chloride may be used). The cooling bath then was removed and the reaction stirred an additional hour. The resulting solution was treated with cold aqueous sodium bicarbonate. The aqueous layer was separated from the pentane/product layer and the pentane/product layer was dried over magnesium sulfate to yield the desired product. $^1$H-NMR: δ (ppm) 7.1 (pent, 1H), 7.3 (d 1H), 7.4 (d, 1H); $^{19}$F-NMR: δ (ppm) 66 (d, 4F), 80 (pent, 1F); MS: m/z 396, 394, 392, 317, 315, 269, 267, 265, 243, 241, 207, 205, 188, 186, 126, 89, 81, 63.

Step 4 Formation of 3-bromo-4-(pentafluorosulfanylethynyl)thiophene

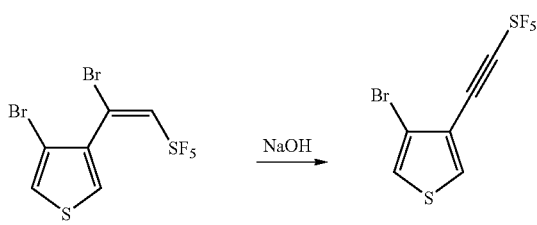

The product, 3-bromo-4-(pentafluorsulfanylethynyl) thiophene, was formed by HBr elimination. Sodium hydroxide powder (6 g, 150 mmol) was added to the pentane/product solution and stirred at room temperature. When HBr elimination was complete, the solution was filtered to remove the base and solvent was removed by rotary evaporation. The product, 3-bromo-4-(pentafluorosulfanylethynyl)thiophene, was recovered as a yellow liquid in 78% yield. It may be purified by distillation at 55° C./200 mTorr. $^1$H-NMR; δ (ppm) 7.3 (d 1H), 7.8 (d, 1H); $^{19}$F-NMR; δ (ppm) 76 (pent, 1F), 83 (d, 4F); MS: m/z 316, 314, 294, 206, 204, 215, 106, 89, 81, 61.

Step 5 Formation of 2-pentafluorosulfanyl-thieno[3,4-b]thiophene

The product of step four was converted to pentafluorosulfanyl-thieno[3,4-b]thiophene according to the equation as follows

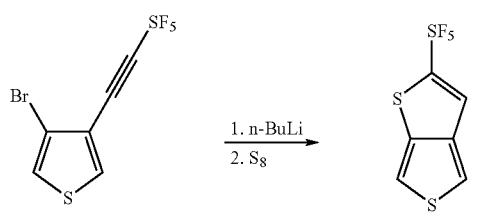

A mixture of 100 ml of diethyl ether and 8.38 g of 3-bromo-4-(pentafluorsulfanylethynyl)thiophene (0.0268 mol) was placed in a 250 mL round-bottomed, three-necked flask equipped with a thermometer-gas inlet combination, a magnetic stir bar, a gas outlet, and a septum sealed port. The air in the flask was completely replaced by nitrogen, after which the solution was cooled to −78° C. (bath with dry ice/acetone).

A solution of a 12.8 mL of 2.5 Molar n-BuLi (0.032 mol, 20% excess) in hexane was added over a few minutes by syringe through the septum, while keeping the temperature below −70° C. Fifteen minutes after completion of n-butyl lithium addition, and the reaction temperature maintained at −78° C., 0.875 g of dry, powdered sulfur (0.0273 mol., 2% excess) was added over a few seconds. The reaction was maintained in the bath and the temperature held below −70° C. After fifteen minutes, 100 mL of methanol, at approx −50° C. was added to the reaction mix and the reaction allowed to warm to room temperature over about 1 hr. The reaction mixture was maintained under nitrogen at 20–25° C. for 20 hr.

The mixture was recovered by filtering through Whatman #1 paper and the solvent removed by rotary evaporation (38° C.). Hexane (80 mL) was added to the flask in 5 aliquots, extracting liquid product from solid residue. The hexane solution was filtered through a 0.45 micron filter and, chromatographed under nitrogen on silica gel with hexane solvent. A forecut—defined to include the shoulder on the UV detectable main peak—and the heartcut—the main UV detected peak, were collected. Solvent was stripped from each cut by rotary evaporation (35° C.). Drying the heartcut at 0.5 torr at 20° C., yielded 2.61 g, purity 99.7%, of the monomer 2-pentafluorosulfanyl-thieno[3,4-b]thiophene.

To the concentrated forecut, 2 mL of hexane was added and the resulting solution cooled to −78° C. The mother liquor was removed from the solids. The solids were recrystallized by adding another 2 mL of hexane and repeating the procedure. Drying at 20° C. and 0.75 torr yielded 0.44 g of 99.8% purity 2-pentafluorosulfanyl-thieno[3,4-b]thiophene. (sum of isolated yield=43%). $^1$H-NMR: δ (ppm) 7.29, 7.4, 7.58; $^{13}$C-NMR: δ (ppm) 111, 117.2, 117.8, 134.2, 140.5, 157; $^{19}$F-NMR: δ (ppm) 69.5(d), 81 (pent);

EXAMPLE 2

Electrochemical Synthesis of Poly(2-pentafluorosulfanyl-thieno[3,4-b]thiophene)

2-Pentafluorosulfanyl-thieno[3,4-b]thiophene was dissolved in 100 mM tetrabutylammonium hexafluorophosphate/acetonitrile solution to a concentration of 10 mM monomer and was electrochemically polymerized employing a 3-electrode configuration, using a platinum button working electrode (2 mm diameter), platinum flag counter electrode (1 cm$^2$), and a Ag/Ag+ nonaqueous reference electrode. The applied potential was cycled between 1.6V and −0.8V at a rate of 100 mV/sec.

Polymerization was apparent from the current response increase in regular intervals at a lower redox potential upon repetitive scans.

EXAMPLE 3

Evaluation of Poly(2-pentafluorosulfanyl-thieno[3,4-b]thiophene)

The electrical properties of poly(2-pentafluorosulfanyl-thieno[3,4-b]thiophene) were determined by examination of the data obtained by cyclic voltammetry. The HOMO energy level of the formed polymer was determined from the onset of the oxidation peak and was found to be −5.71 eV. The onset of reduction peak indicates the location of the LUMO. The difference between the HOMO and LUMO is the band gap which was calculated to be 0.6 eV. Thus, poly(2-pentafluorosulfanyl-thieno[3,4-b]thiophene) displays one of the lowest reported band gaps in a conjugated polymer and one of the most negative HOMO levels ever observed in a conjugated polymer which recommends this polymer for numerous applications.

Light emitting polymers (PLED) require a hole injecting layer (HIL). The purpose of the HIL is to transmit the holes from the ITO (Anode) to the light emitting material. The efficiency of this transmission process is dependant on the differences of the workfunctions of the materials involved. The workfunction of the HIL material should match or be below the workfunction of the light emitting material. For example, if the workfunction of the polymeric light emitting material is −5.5 eV, then the workfunction of −5.5 eV or less for the HIL is desired for an efficient device. The most promising polymeric light emitting materials that may find application in PLED's exhibit a range of workfunctions between −5.2−−5.7 eV. Poly(2-pentafluorosulfanyl-thieno [3,4-b]thiophene) can meet this range.

The pentafluoro substituted thienothiophenes and the conjugated oligomers and polymers made therefrom of this invention provide materials that are useful as conductive polymers, and may have a negative HOMO level, and/or a low band gap.

The invention has been described with reference to particular embodiments, but other embodiments are apparent to persons of skill in the art, and are included within the scope of the claims.

What is claimed is:

1. A polymer having polymerized units of 2-pentafluorosulfanyl-thieno[3,4-b]thiophene.

2. A homopolymer represented by the formula:

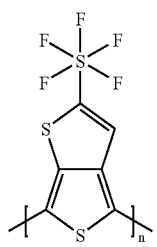

wherein n is an integer.

3. A thienothiophene composition comprising an SF5 group represented by the formula:

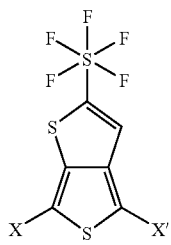

where X and X' comprise at least one member independently selected from the group consisting of H, halogen atoms, MgCl, MgBr, MgI, Sn(R')$_3$, boronic acids, boronic esters, —CH=CHR"—, —OC$_{1-6}$ alkyl, —COOC$_{1-6}$ alkyl, S—COR''' and —COR'''—C≡CH, and polymerizable aromatic groups, where R' comprises C$_{1-6}$ alkyl or —OC$_{1-6}$ alkyl, where R" comprises H or C$_{1-6}$ alkyl, and where R''' comprises H or C$_{1-6}$ alkyl.

4. The composition of claim 3 wherein X and X' comprise H.

5. The composition of claim 3 wherein at least one of X and X' comprise a boronic ester or boronic acid.

6. The composition of claim 3 wherein at least one of X and X' comprise H.

7. The composition of claim 3 wherein at least one of X and X' comprise a halogen.

8. The composition of claim 7 wherein the halogen comprises at least one member selected from the group consisting of I, Br, and Cl.

9. The composition of claim 3 wherein X and X' comprise —CH=CHR" and R" comprise H.

10. The composition of claim 3 wherein at least one of X and X' comprise —C≡CH.

11. The composition of claim 3 wherein at least one of X and X' comprise Sn(R')$_3$.

12. The composition of claim 3 wherein at least one of X and X' comprise a polymerizable aromatic group.

13. The polymer of claim 12 wherein at least one of X and X' comprise at least one member selected from the group consisting of phenyl, naphthalene, pyrrole, dithiophene, and thiophene.

14. The polymer of claim 12 wherein at least one of X and X' comprise thienothiophene.

15. A polymer comprising pentafluorosulfanyl substituted thienothiophene comprised of polymerized units represented by the formula:

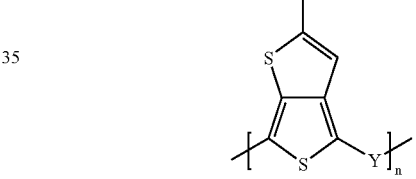

where n is an integer, Y comprises at least one member selected from the group consisting of —CZ$^1$=CZ$^2$— or —C≡C—, and Z$^1$ and Z$^2$ comprise at least one member independently selected from the group consisting of H, F, Cl and CN.

16. The polymer of claim 15 wherein n is an integer from 2 to 50,000 units.

17. The polymer of claim 15 wherein Y comprises —CH=CHR"— and R" comprises H.

18. The polymer of claim 15 wherein Y comprises —C≡C—.

* * * * *